US012256663B2

(12) United States Patent
Sauder et al.

(10) Patent No.: US 12,256,663 B2
(45) Date of Patent: Mar. 25, 2025

(54) CROP INPUT APPLICATION SYSTEMS AND APPARATUS

(71) Applicant: 360 Yield Center, LLC, Morton, IL (US)

(72) Inventors: Talon Sauder, Green Valley, IL (US);
Justin L. Koch, Morton, IL (US);
Gregg A. Sauder, Tremont, IL (US);
Tim Sauder, Tremont, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 828 days.

(21) Appl. No.: 17/426,730

(22) PCT Filed: Feb. 14, 2020

(86) PCT No.: PCT/US2020/018374
§ 371 (c)(1),
(2) Date: Jul. 29, 2021

(87) PCT Pub. No.: WO2020/168248
PCT Pub. Date: Aug. 20, 2020

(65) Prior Publication Data
US 2022/0095528 A1    Mar. 31, 2022

Related U.S. Application Data

(60) Provisional application No. 62/806,186, filed on Feb. 15, 2019.

(51) Int. Cl.
*A01C 7/06* (2006.01)
*A01B 79/00* (2006.01)
*A01C 5/06* (2006.01)

(52) U.S. Cl.
CPC .............. *A01C 7/06* (2013.01); *A01B 79/005* (2013.01); *A01C 5/064* (2013.01)

(58) Field of Classification Search
CPC ............ A01C 7/048; A01C 5/062–068; A01B 79/005; A01B 79/02
See application file for complete search history.

(56) References Cited

U.S. PATENT DOCUMENTS

| 6,082,275 A | 7/2000 | Schaffert |
| 6,827,029 B1 | 12/2004 | Wendte |
| 11,229,153 B2 * | 1/2022 | Plattner ................ A01B 63/008 |
| 2007/0044694 A1 | 3/2007 | Martin |
| 2011/0226167 A1 * | 9/2011 | Schilling et al. ...... A01C 5/064 |
| | | 111/154 |
| 2012/0240834 A1 * | 9/2012 | Schilling et al. ...... A01C 7/203 |
| | | 111/163 |

(Continued)

FOREIGN PATENT DOCUMENTS

| EP | 3139724 B1 * | 10/2018 | ........... A01B 79/005 |
| WO | WO-2017112892 A1 * | 6/2017 | ........... A01B 63/008 |

OTHER PUBLICATIONS

International Search Report and Written Opinion for PCT Application No. PCT/US20/18374 dated May 13, 2020, 7 pages.

*Primary Examiner* — Tara Mayo
(74) *Attorney, Agent, or Firm* — Klintworth & Rozenblat IP LLP

(57) ABSTRACT

Crop input application systems, methods and apparatus are provided. In some examples, a blade is disposed to remove soil from a trench sidewall and deposit soil on top of a seed in the trench.

20 Claims, 7 Drawing Sheets

(56) References Cited

U.S. PATENT DOCUMENTS

| | | |
|---|---|---|
| 2014/0026748 A1 | 1/2014 | Stoller et al. |
| 2014/0048296 A1 | 2/2014 | Bassett |
| 2016/0100517 A1 | 4/2016 | Bassett |
| 2017/0208736 A1* | 7/2017 | Schaffert et al. ...... A01C 5/068 |
| 2017/0265377 A1 | 9/2017 | Landphair et al. |
| 2018/0184581 A1* | 7/2018 | Morgan et al. ...... G01N 21/359 |
| 2022/0000010 A1* | 1/2022 | Kowalchuk et al. .. A01C 5/068 |

* cited by examiner

CROP INPUT APPLICATION SYSTEMS AND APPARATUS

CROSS-REFERENCE TO RELATED APPLICATIONS

This application claims the benefit of priority to U.S. provisional application No. 62/806,186, entitled CROP INPUT APPLICATION SYSTEMS, METHODS, AND APPARATUS, filed on Feb. 15, 2019 which is hereby incorporated by reference.

BACKGROUND

Applicators such as irrigation systems, sprayers, sidedress bars, etc. are used to apply one or more crop inputs; some examples are used to apply one or more crop inputs during a seed planting operation. incorporated by reference.

SUMMARY

In one embodiment, a crop input applicator is disclosed. The crop input applicator includes a frame, a blade, an actuator, and a controller. The blade is connected with the frame. The actuator is connected with the frame and the blade. The controller is configured to control the actuator to move the blade laterally relative to the frame.

In a second embodiment, another crop input applicator is disclosed. The crop input applicator includes a frame, a support body, a blade, and forward and rearward seed farmers. The support body is connected to the frame. The blade is connected to the support body. The forward seed firmer is connected with the support body and is disposed below the blade at a forward portion of the blade. The rearward seed firmer is connected with the support body and is disposed below the blade at a rearward portion of the blade.

The scope of the present disclosure is defined solely by the appended claims and is not affected by the statements within this summary.

DESCRIPTION

Figure 1A:
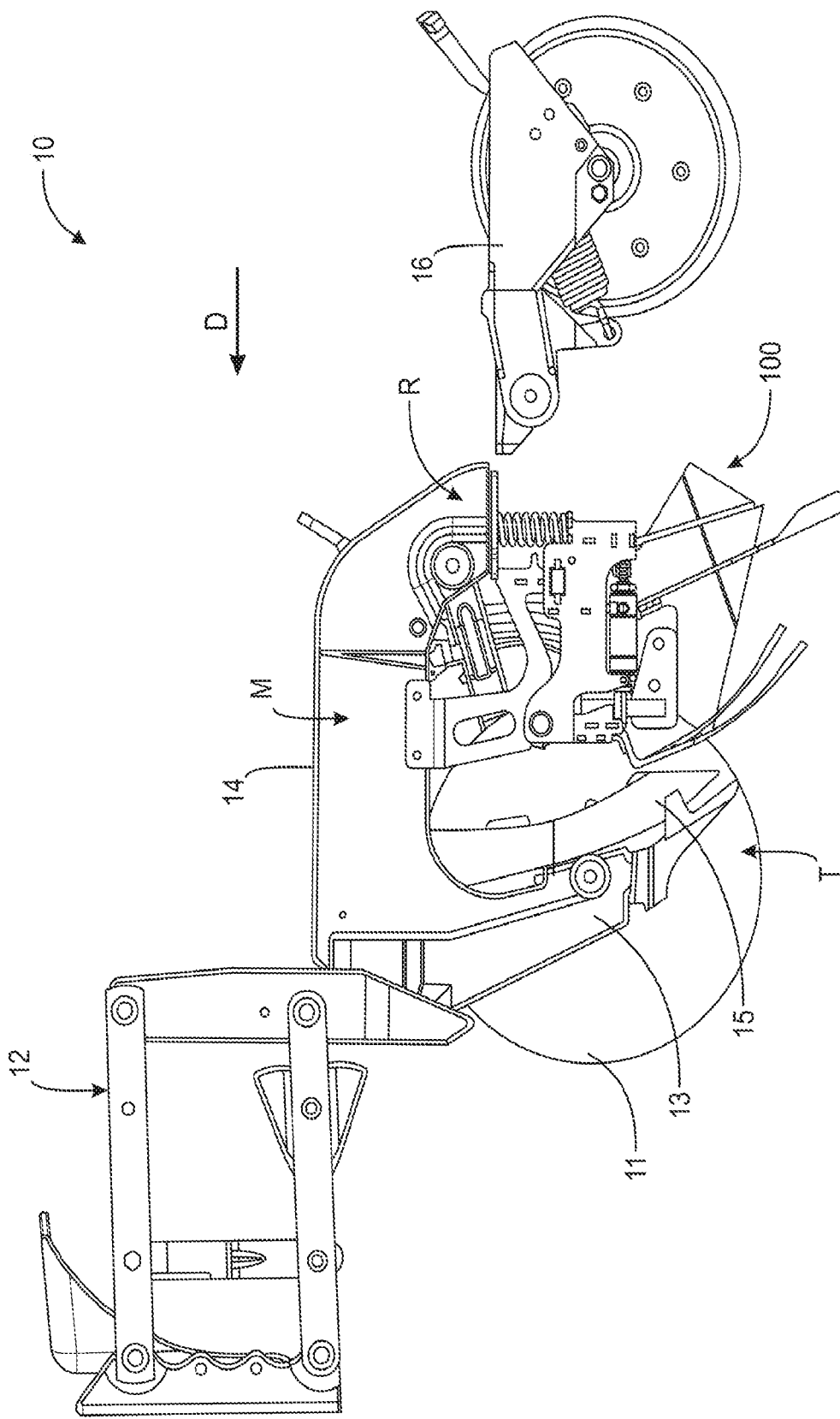
FIG. 1A is a side elevation view of an example of a planter row unit incorporating an example of a crop input applicator assembly.

Referring now to the drawing figures wherein like reference numerals designate the same or corresponding components throughout the several figures, FIG. 1A illustrates one example of a crop input applicator assembly 100 incorporated on one example of a row unit 10. The row unit 10 optionally comprises a subframe 14 operably coupled to a planter toolbar (not shown) by a parallel arm assembly 12 or other operable coupling. A pair of opener discs 11 are optionally rollingly coupled to a downwardly-extending shank 13 of the subframe 14. The opener discs 11 optionally open a trench T (e.g., v-shaped trench) near lower ends of the opener discs. A seed deposition apparatus such as a seed tube 15 is optionally supported on the subframe 14 (e.g., rearward of the shank 13 along travel direction D). The seed tube 15 is optionally disposed to deposit seeds in the trench T. The crop input applicator assembly 100, described in more detail herein according to various examples, is optionally mounted to the subframe 14 at one or more locations (e.g., middle location M and rearward location R) such as by bolts, other fasteners, welding, or any other temporary, semi-permanent, or permanent manner. The crop input applicator assembly 100 is optionally disposed at least partially rearward of the seed tube 15. A closing wheel assembly 16 is optionally pivotally coupled to a rearward end of the subframe 14.

Figure 1B:
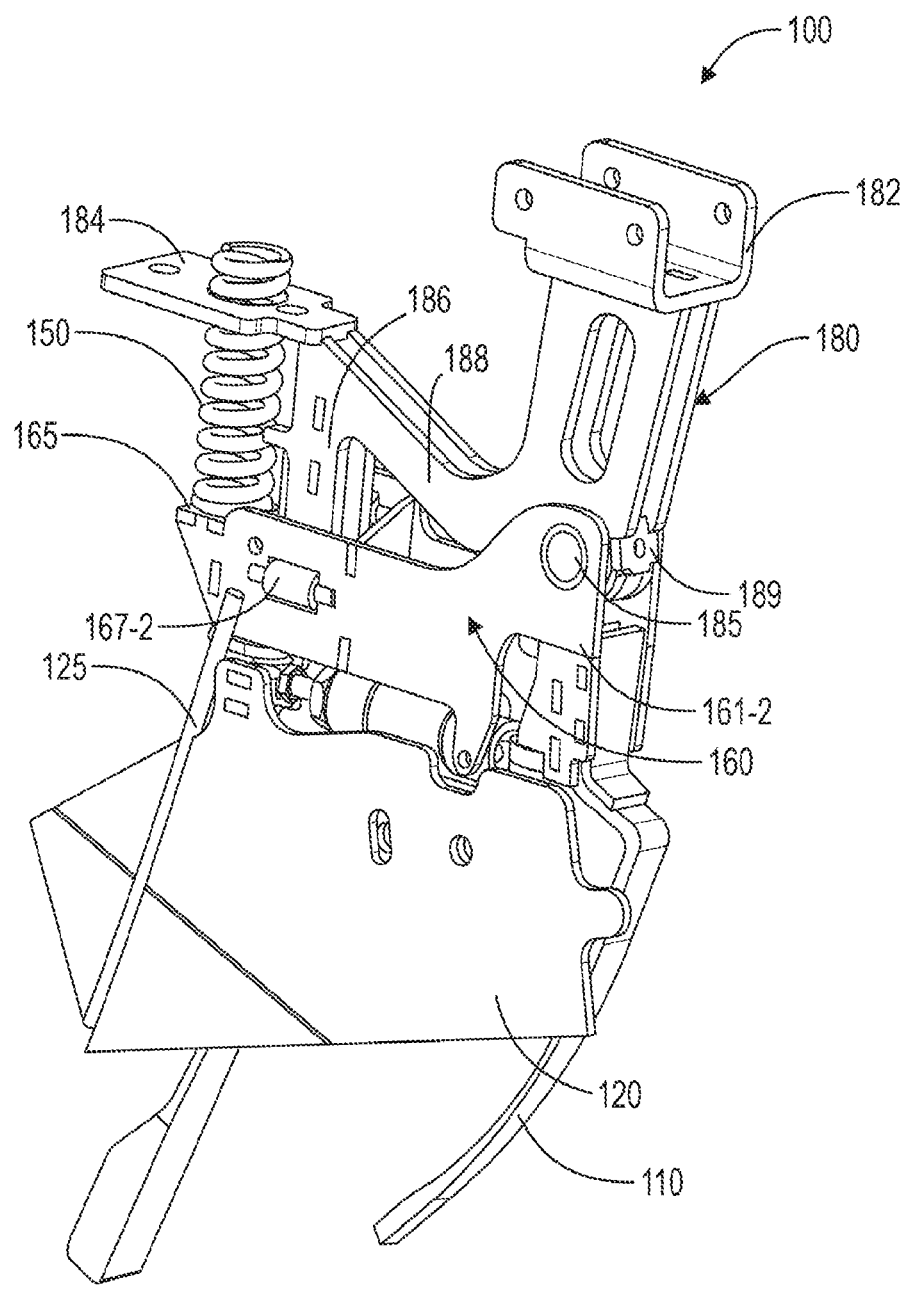
FIG. 1B is a perspective view of at least a portion of the crop input applicator assembly of FIG. 1.
Figure 2:
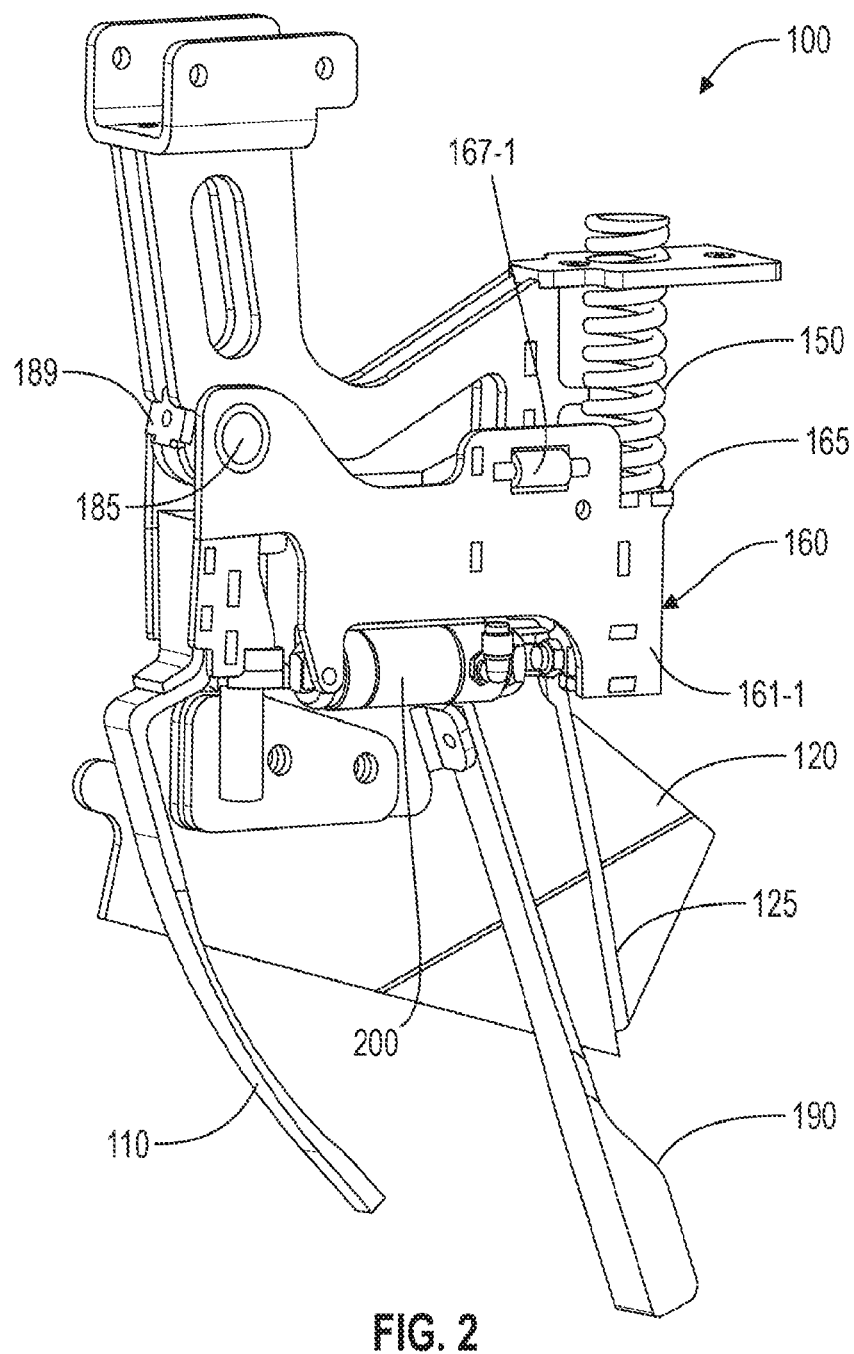
FIG. 2 is another perspective view of at least a portion of the crop input applicator assembly of FIG. 1.

Referring to FIGS. 1B and 2, the crop input applicator assembly 100 is illustrated in more detail. The assembly 100 optionally includes a frame 180 which may be mounted to subframe 14 (e.g., by mounting one or more plates 182 at location M and/or mounting one or more plates 184 at location R). A support body 160 (e.g., comprising plates 161-1, 161-2 optionally disposed on opposing sides of the frame 180) is optionally pivotally coupled to the frame 180, such as at a pivot 185 (e.g., for pivoting about a generally horizontal axis). In some examples, pivotal movement of the support body 160 is guided by guide rollers 167-1, 167-2 rollingly supported on plates 161-1, 161-2, respectively. The guide rollers 167 optionally rollingly engage the frame 180 (e.g., a downwardly-extending portion 186 of the frame 180). In some examples, the portion 186 depends or extends downward from a rearwardly-extending portion 188 of the frame 180.

The support body 160 is optionally downwardly biased relative to the frame 180 by a spring 150. The spring 150 optionally contacts the subframe 14 and/or the plate 184 at an upper end. The spring 150 optionally contacts a plate 165 or other portion of the support body 160 at a lower end. A stop 189 (e.g., mounted to the frame 180) optionally limits the extent of downward pivotal movement of the body 160 relative to frame 180.

In some examples, a forward seed firmer 110 is supported on the body 160. In some examples, an upper end of the forward seed firmer 110 is removably attached to the body 160 (e.g., by a quick-connect mechanism). In some examples, the firmer 110 has a medial flexible portion such that the lower end of the firmer 110 resiliently engages the ground (e.g., at the bottom of a seed trench). In some examples, a liquid conduit (not shown) is supported on the firmer 110 for applying liquid adjacent to (e.g., rearward of or laterally of) the firmer 110.

In some examples, a rearward seed firmer 190 is supported on the body 160. In some examples, an upper end of the rearward seed firmer 190 is removably attached to the body 160 (e.g., by a quick-connect mechanism). In some examples, the firmer 190 has a medial flexible portion such that the lower end of the firmer 190 resiliently engages the ground (e.g., at the bottom of a seed trench). In some examples, the lower end of the firmer 190 is larger (e.g., optionally taller and/or wider) than the lower end of the firmer 110. In some examples, a liquid conduit (not shown)

is supported on the firmer 190 for applying liquid adjacent to (e.g., rearward of or laterally of) the firmer 190.

Figure 4:
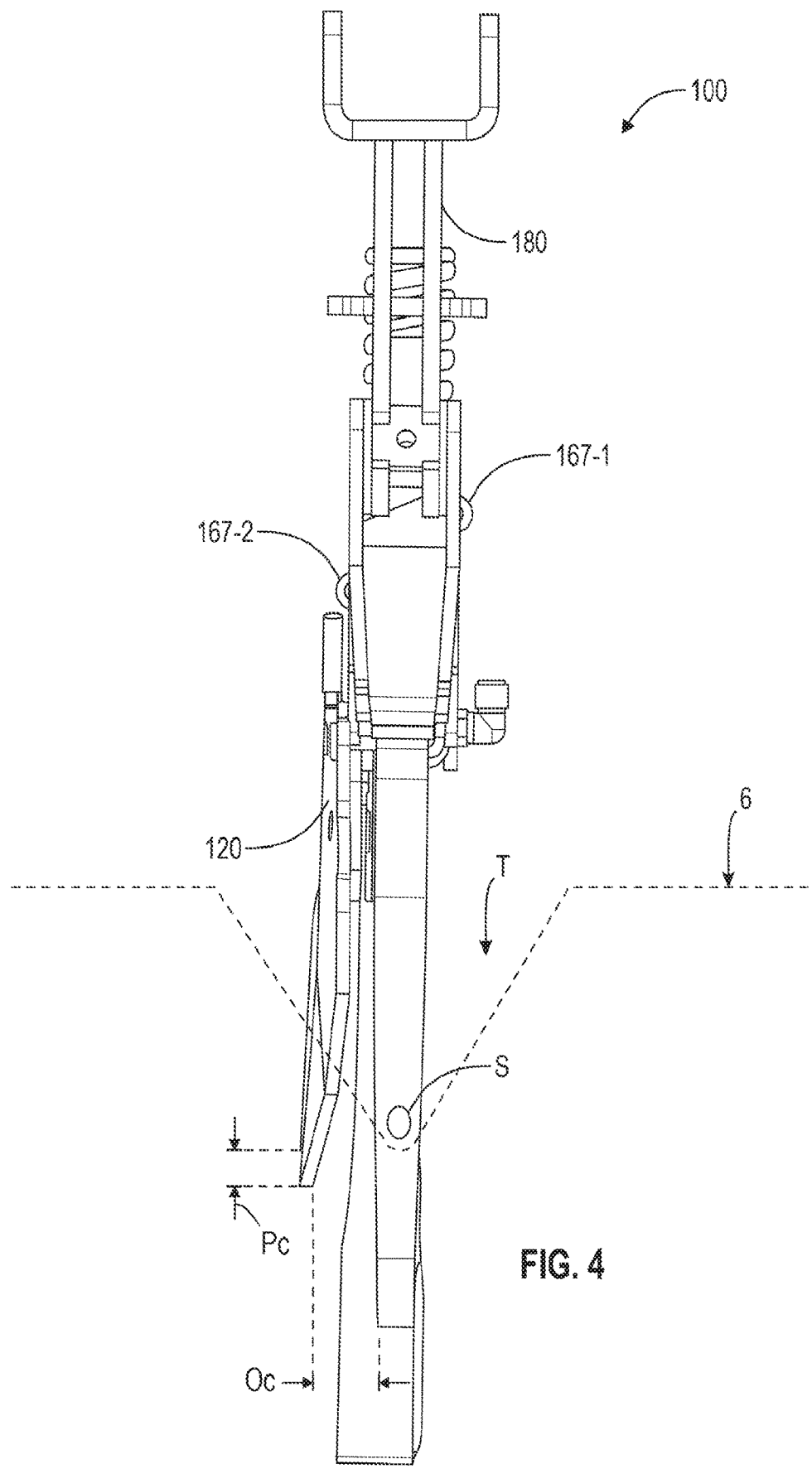
FIG. 4 is a front elevation view of at least a portion of the crop input applicator assembly of FIG. 1.

In some examples, a blade 120 is optionally mounted to the support body 160. In some examples, the blade 120 is disposed outboard of the firmer 110 and/or firmer 190. As best seen in FIG. 4, in some examples, the blade 120 is disposed at an offset angle relative to a vertical longitudinal plane (e.g., a vertical plane parallel to the travel direction D). In some examples, the blade 120 is disposed at a complex offset angle relative to a vertical longitudinal plane. In some examples, a crop input application conduit 125 (e.g., tube made of metal or other material) is supported on the blade 120. The blade 120 is optionally disposed to open a slot in a seed trench T. The conduit 125 is optionally disposed to apply crop input (e.g., liquid crop input into the slot opened by the blade 120).

Referring to FIG. 4, the assembly 100 is illustrated relative to a trench T formed in the ground G (e.g., by opener discs of the row unit). It should be appreciated that the firmers 110, 190 are shown in their at rest or undeformed positions in FIG. 4; in operation, the firmers 110, 190 optionally deform such that the tail ends of the firmers 110, 190 engage the bottom of trench T.

In operation, the firmer 110 optionally firms a seed S into the trench T. Liquid input (e.g., fertilizer) is optionally applied on or near the seed S via a conduit optionally supported on firmer 110. The blade 120 optionally cuts soil (e.g., moist soil) from the side wall of trench T at an additional depth Dc (e.g., between about 0.25 and about 0.75 inches, between about 0.25 and about 1 inches, about 0.75 inches, between about 0.5 and about 0.8 inches, etc.) deeper than the bottom of the trench T (and/or deeper than the bottom of firmer 110 and/or firmer 190 in the trench T). The bottom of blade 120 optionally cuts into the sidewall at a lateral offset Oc (e.g., 0.75 inches, about 0.75 inches, between about 0.5 and about 0.8 inches) from the bottom of the trench T (and/or the position of seed S). In some examples, optionally due to the complex offset angle of blade 120, the blade 120 optionally moves soil from the sidewall of trench T to the bottom of the trench T, forming a layer of soil (e.g., moist soil) on top of the seeds S at the bottom of trench T. In some examples, the firmer 190 firms the layer of soil deposited by blade 120 onto the seeds S. In some examples, soil moved into the trench T by the closing wheel assembly 16 is at least partially spaced apart from seeds S by the layer of soil placed on top of the seeds S by the blade 120.

In operation of some examples, the assembly 100 pivots upwardly (e.g., compressing the spring 150) upon encountering an obstruction (e.g., rock, etc.). For example, when blade 120 contacts an obstruction, the assembly 100 optionally pivots upwardly over the obstruction and optionally resiliently returns to its previous position (e.g., such that blade 120 again cuts to the previous depth).

Figure 3:
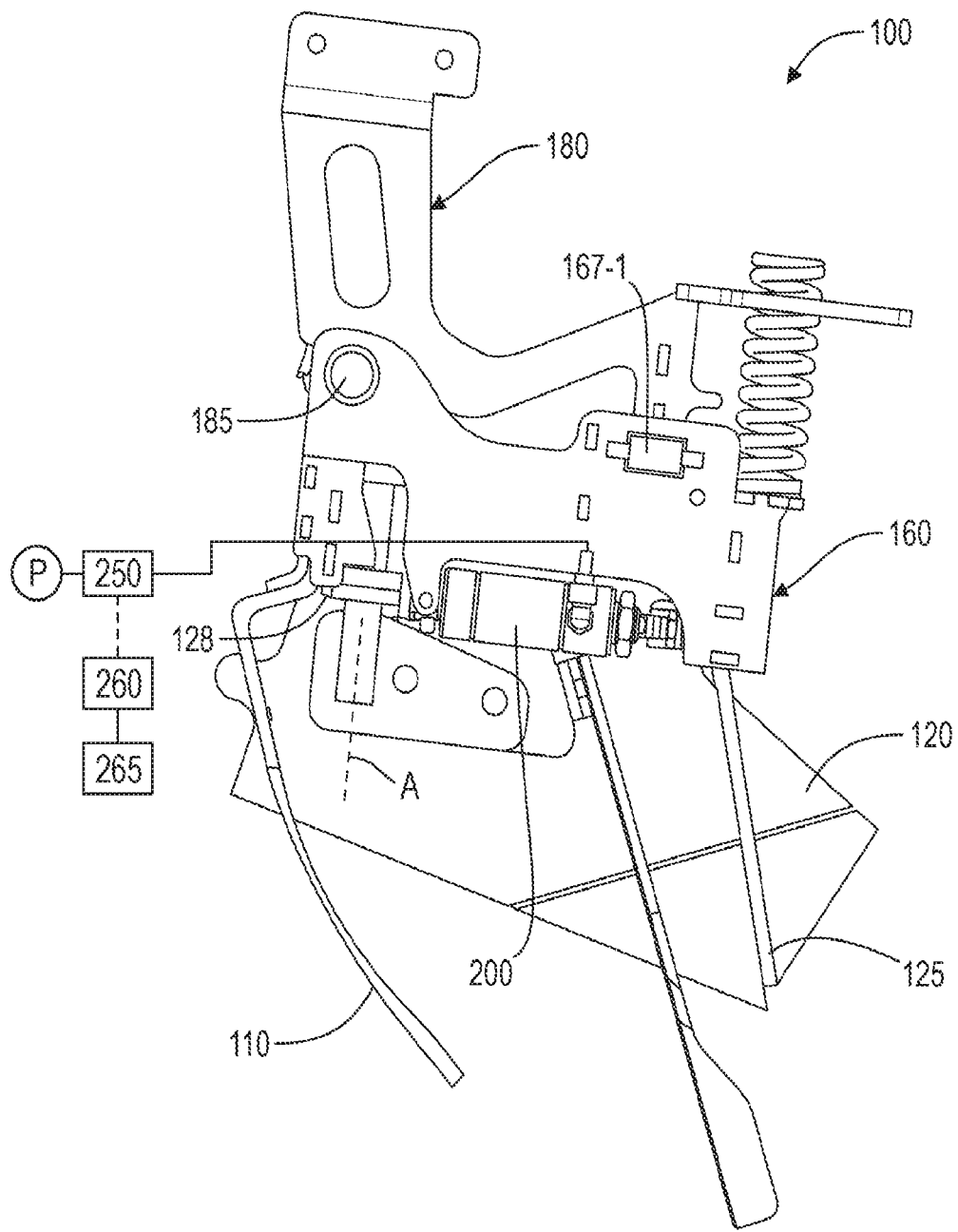
FIG. 3 is a side elevation view of at least a portion the crop input applicator assembly of FIG. 1.

Referring to FIG. 3, in some examples an actuator 200 is used to modify the position of blade 120. In some examples, the blade 120 is pivotally coupled to support body 160 by a pivot 128 defining a generally vertical pivot axis A. In some examples, actuator 200 is operably coupled to the support body 160 and the blade 120 such that extension or retraction of actuator 200 causes the blade 120 to pivot about axis A. In some examples, actuator 200 comprises an optionally spring-biased air cylinder which is optionally selectively in fluid communication with a pressure source P, e.g., via a valve 250. In other examples, the actuator 200 may include other drive members such as, for example, a hydraulic cylinder, a screw drive, etc. In some examples, a valve 250 is operated by a controller 260 which is in data communication with a kinematic sensor 265 (e.g., gyroscope, accelerometer, GPS, etc.) which is optionally mounted to the planter. In some implementations, when the kinematic sensor 265 indicates that the planter is executing a turn in the direction of the blade 120 (e.g., a right hand turn if the blade is on the right side of the trench T, or a left hand turn if the blade is on the left side of the trench T), the controller 260 optionally actuates valve 250 in order to modify an extension of actuator 200 and move the blade 120 laterally away from the center of the trench T (and thus away from seeds S which might otherwise be contacted by the blade 120 during the turn). Once the turn is complete, the controller 260 and actuator 200 optionally return the blade 120 to its normal position.

Figure 5:
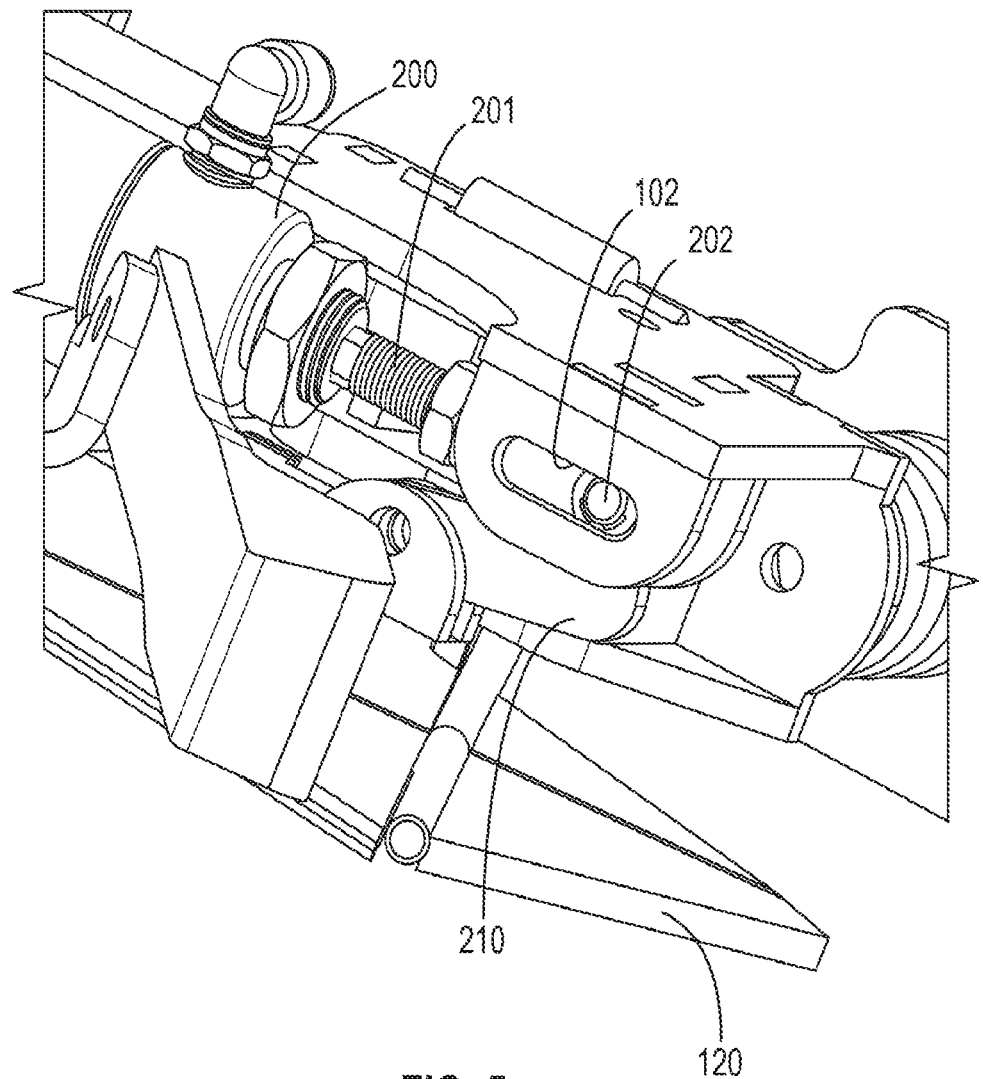
FIG. 5 is a bottom perspective view of at least a portion of the crop input applicator assembly of FIG. 1 in one example of a first or normal configuration.
Figure 6:
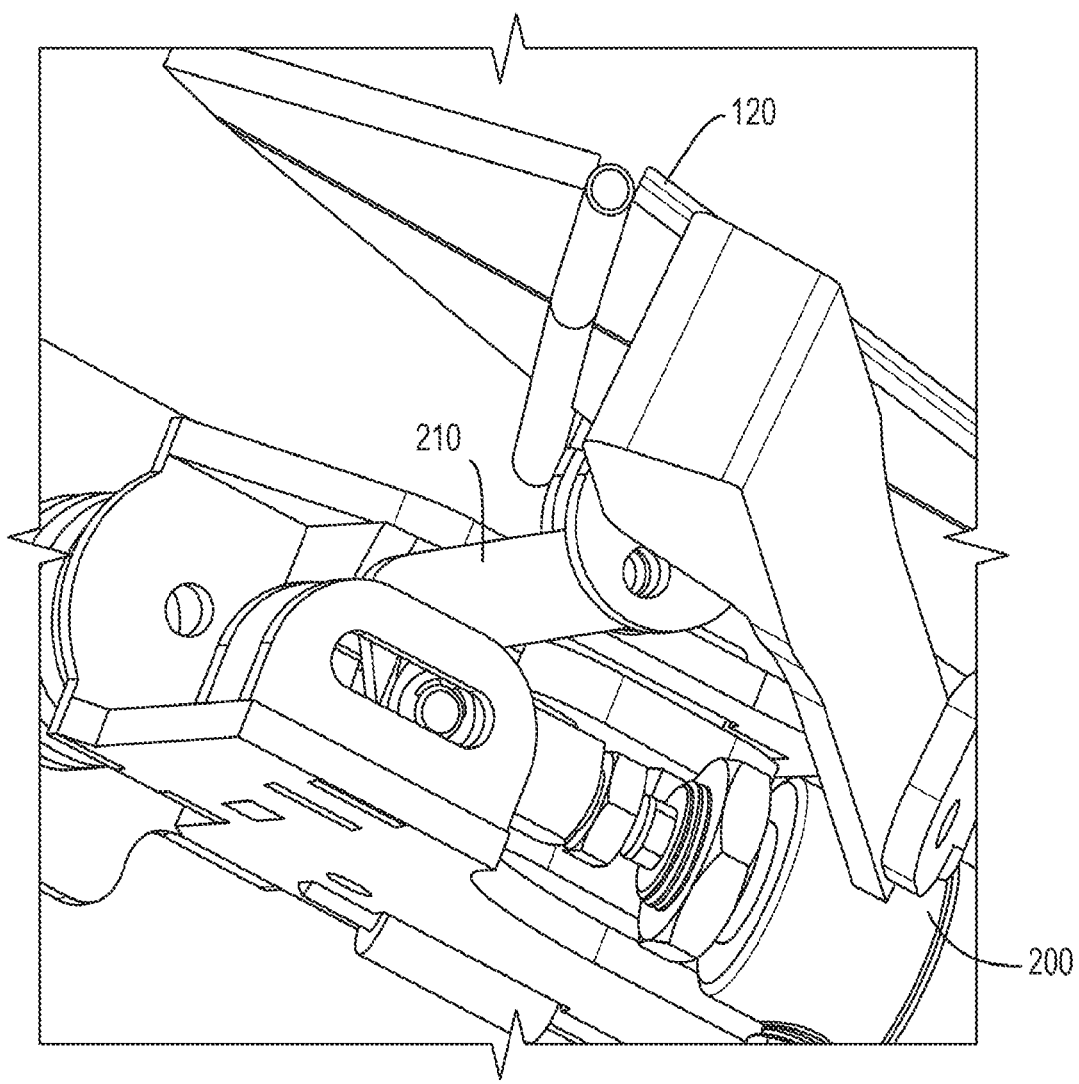
FIG. 6 is a bottom perspective view of at least a portion of the crop input applicator assembly of FIG. 1 in one example of a second or offset configuration.

Comparing FIGS. 5 and 6, the actuator 200 is shown in one example of a first or normal extended position or configuration and in one example of a second or retracted position or configuration, respectively. It should be appreciated that in various examples, various mechanical couplings may be used such that either extension or retraction of an actuator may be used to move the blade 120 away from the center of trench T. In some examples, a spring 201 keeps the actuator 200 in a normally extended position. When the actuator is retracted (e.g., by energizing the rod end of the cylinder), the spring 201 is compressed. The movement of actuator 200 is guided by a slot 102 supported on the support body 160; in some examples, a guide 202 mounted on a rod of the actuator 200 is positioned at least partially in and slidingly engages the slot 102.

The rod end of actuator 200 is optionally pivotally coupled to a link 210. The link 210 is optionally pivotally coupled to the blade 120. When the actuator 200 is retracted, the linkage formed by link 210 causes the blade 120 to move laterally outward (e.g., by pivoting about axis A). When the actuator 200 is moved to its normal extended position (e.g., by the spring 201), the linkage formed by link 210 causes the blade 120 to return to its normal position.

Various modifications to the examples and the general principles and features of the apparatus, systems and methods described herein will be readily apparent to those of skill in the art. Thus, the foregoing description is not to be limited to the examples of the apparatus, systems and methods described herein and illustrated in the drawing figures.

The invention claimed is:

1. A crop input applicator comprising:
   a frame;
   a blade connected with the frame;
   a support body connected to and between the frame and the blade, the support body pivotally connected to the frame;
   an actuator connected with the frame and the blade; and a controller;
   wherein the controller is configured to control the actuator to move the blade laterally relative to the frame.

2. The crop input applicator of claim 1 wherein the blade is pivotally coupled to the support body.

3. The crop input applicator of claim 1 further comprising a spring connected between the support body and the frame.

4. The crop input applicator of claim 1 further comprising a guide roller attached to the support body, the guide roller rollingly engaged with the frame.

5. The crop input applicator of claim 1 further comprising a valve, wherein the controller is configured to control the valve to actuate the actuator to move the blade laterally relative to the frame.

6. The crop input applicator of claim 1 further comprising a sensor, wherein the controller is configured to control the actuator to move the blade laterally relative to the frame based on information received from the sensor.

7. The crop input applicator of claim 1 further comprising a forward seed firmer and a rearward seed firmer both connected with the support body, the forward seed firmer disposed below the blade at a forward portion of the blade and the rearward seed firmer disposed below the blade at a rearward portion of the blade.

8. A crop input applicator comprising:
a frame;
a support body connected to the frame;
a blade connected to the support body;
a forward seed firmer connected with the support body, the forward seed firmer disposed below the blade at a forward portion of the blade; and
a rearward seed firmer connected with the support body, the rearward seed firmer disposed below the blade at a rearward portion of the blade.

9. The crop input applicator of claim 8 wherein the support body is pivotally coupled to the frame.

10. The crop input applicator of claim 9 further comprising a spring connected between the support body and the frame.

11. The crop input applicator of claim 9 further comprising a guide roller attached to the support body, the guide roller rollingly engaged with the frame.

12. The crop input applicator of claim 8 wherein the blade is pivotally coupled to the support body.

13. A crop input applicator comprising:
a frame;
a blade connected with the frame;
a support body connected to and between the frame and the blade;
a forward seed firmer and a rearward seed firmer both connected with the support body, the forward seed firmer disposed below the blade at a forward portion of the blade and the rearward seed firmer disposed below the blade at a rearward portion of the blade;
an actuator connected with the frame and the blade; and a controller;
wherein the controller is configured to control the actuator to move the blade laterally relative to the frame.

14. The crop input applicator of claim 13 wherein the support body is pivotally connected to the frame.

15. The crop input applicator of claim 14 further comprising a spring connected between the support body and the frame.

16. The crop input applicator of claim 14 further comprising a guide roller attached to the support body, the guide roller rollingly engaged with the frame.

17. The crop input applicator of claim 13 wherein the blade is pivotally coupled to the support body.

18. The crop input applicator of claim 13 wherein the support body is pivotally connected to the frame, and the blade is pivotally coupled to the support body.

19. The crop input applicator of claim 13 further comprising a valve, wherein the controller is configured to control the valve to actuate the actuator to move the blade laterally relative to the frame.

20. The crop input applicator of claim 13 further comprising a sensor, wherein the controller is configured to control the actuator to move the blade laterally relative to the frame based on information received from the sensor.

* * * * *